US007239605B2

(12) United States Patent
Dinker et al.

(10) Patent No.: US 7,239,605 B2
(45) Date of Patent: Jul. 3, 2007

(54) ITEM AND METHOD FOR PERFORMING A CLUSTER TOPOLOGY SELF-HEALING PROCESS IN A DISTRIBUTED DATA SYSTEM CLUSTER

(75) Inventors: Darpan Dinker, San Jose, CA (US); Pramod Gopinath, Union City, CA (US); Mahesh Kannan, San Jose, CA (US); Suveen R. Nadipalli, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1067 days.

(21) Appl. No.: 10/252,275

(22) Filed: Sep. 23, 2002

(65) Prior Publication Data

US 2004/0066741 A1  Apr. 8, 2004

(51) Int. Cl.
 *G06F 11/00* (2006.01)
(52) U.S. Cl. .......................... 370/216; 714/15
(58) Field of Classification Search .............. 714/4–8, 714/15; 370/216–218, 254–256; 707/8; 709/213–216
 See application file for complete search history.

(56) References Cited

U.S. PATENT DOCUMENTS

| 5,454,108 A | 9/1995 | Devarakonda et al. |
| 5,634,122 A | 5/1997 | Loucks et al. |
| 5,666,486 A | 9/1997 | Alfieri et al. |
| 5,684,807 A | 11/1997 | Bianchini et al. |
| 5,812,780 A | 9/1998 | Chen et al. |
| 5,852,747 A | 12/1998 | Bennett et al. |
| 5,909,540 A * | 6/1999 | Carter et al. .................... 714/4 |
| 5,913,213 A | 6/1999 | Wikstrom et al. |
| 5,920,872 A * | 7/1999 | Grewell et al. ............. 707/202 |
| 5,951,694 A | 9/1999 | Choquier et al. |
| 5,991,893 A * | 11/1999 | Snider ......................... 714/4 |
| 6,002,868 A | 12/1999 | Jenkins et al. |
| 6,006,259 A | 12/1999 | Adelman et al. |

(Continued)

OTHER PUBLICATIONS

"Concurrency Service Specification," Published Apr. 2000, Object Management Group.

(Continued)

*Primary Examiner*—Chau Nguyen
*Assistant Examiner*—Marcus Smith
(74) *Attorney, Agent, or Firm*—Robert C. Kowert; Meyertons, Hood, Kivlin, Kowert & Goetzel, P.c.

(57) ABSTRACT

A cluster topology self-healing process is performed in order to replicate a data set stored on a failed node from a first node storing another copy of the data set to a second non-failed node. The self-healing process is performed by: locking one of several domains included in the data set, where locking that domain does not lock any of the other domains in the data set; storing data sent from the first node to the second node in the domain; and releasing the domain. This process of locking, storing, and releasing is repeated for each other domain in the data set. Each domain may be locked for significantly less time than it takes to copy the entire data set. Accordingly, client access requests targeting a locked domain will be delayed for less time than if the entire data set is locked during the self-healing process.

25 Claims, 7 Drawing Sheets

U.S. PATENT DOCUMENTS

| | | | |
|---|---|---|---|
| 6,014,669 A * | 1/2000 | Slaughter et al. | 707/10 |
| 6,032,216 A | 2/2000 | Schmuck et al. | |
| 6,067,559 A | 5/2000 | Allard et al. | |
| 6,108,699 A | 8/2000 | Moiin | |
| 6,167,490 A | 12/2000 | Levy et al. | |
| 6,175,931 B1 | 1/2001 | Hornung | |
| 6,192,401 B1 | 2/2001 | Modiri et al. | |
| 6,249,879 B1 | 6/2001 | Walker et al. | |
| 6,324,492 B1 | 11/2001 | Rowe | |
| 6,430,335 B1 | 8/2002 | Carberry et al. | |
| 6,477,172 B1 | 11/2002 | Burger et al. | |
| 6,480,473 B1 | 11/2002 | Chambers et al. | |
| 6,512,740 B1 | 1/2003 | Baniewicz et al. | |
| 6,522,995 B1 | 2/2003 | Conti et al. | |
| 6,532,494 B1 * | 3/2003 | Frank et al. | 709/224 |
| 6,567,808 B1 | 5/2003 | Eschelbeck et al. | |
| 6,574,197 B1 | 6/2003 | Kanamaru et al. | |
| 6,574,749 B1 * | 6/2003 | Parsons | 714/15 |
| 6,587,921 B2 * | 7/2003 | Chiu et al. | 711/119 |
| 6,591,295 B1 | 7/2003 | Diamond et al. | |
| 6,718,394 B2 | 4/2004 | Cain et al. | |
| 6,748,429 B1 | 6/2004 | Talluri et al. | |
| 6,748,554 B2 | 6/2004 | Jin et al. | |
| 6,801,937 B1 | 10/2004 | Novaes et al. | |
| 6,816,905 B1 | 11/2004 | Sheets et al. | |
| 6,820,210 B1 | 11/2004 | Daruwalla et al. | |
| 6,847,993 B1 | 1/2005 | Novaes et al. | |
| 6,895,401 B2 | 5/2005 | Skinner et al. | |
| 6,920,474 B2 | 7/2005 | Walsh et al. | |
| 6,928,378 B2 | 8/2005 | Lebee et al. | |
| 6,944,788 B2 | 9/2005 | Dinker et al. | |
| 6,961,769 B2 | 11/2005 | Arora et al. | |
| 6,996,674 B2 * | 2/2006 | Chiu et al. | 711/118 |
| 7,139,809 B2 * | 11/2006 | Husain et al. | 709/213 |
| 2001/0014097 A1 | 8/2001 | Beck et al. | |
| 2001/0027453 A1 | 10/2001 | Suto | |
| 2001/0040895 A1 | 11/2001 | Templin | |
| 2002/0042693 A1 | 4/2002 | Kamp et al. | |
| 2002/0062372 A1 | 5/2002 | Hong et al. | |
| 2002/0073080 A1 | 6/2002 | Lipkin | |
| 2002/0143958 A1 | 10/2002 | Montero et al. | |
| 2002/0152307 A1 | 10/2002 | Doyle et al. | |
| 2003/0046394 A1 * | 3/2003 | Goddard et al. | 709/226 |
| 2003/0131041 A1 | 7/2003 | Dinker et al. | |
| 2003/0154202 A1 | 8/2003 | Dinker et al. | |
| 2003/0204509 A1 | 10/2003 | Dinker et al. | |
| 2003/0204623 A1 | 10/2003 | Cain | |
| 2003/0204786 A1 | 10/2003 | Dinker et al. | |
| 2004/0044672 A1 | 3/2004 | Spencer | |
| 2004/0059805 A1 | 3/2004 | Dinker et al. | |
| 2004/0098490 A1 | 5/2004 | Dinker et al. | |
| 2004/0103098 A1 | 5/2004 | Mitra | |
| 2004/0162885 A1 | 8/2004 | Garg et al. | |
| 2004/0199815 A1 | 10/2004 | Dinker et al. | |

OTHER PUBLICATIONS

Devarakonda, Murthy et al., "Recovery in the Calypso Filesystem," ACM Transactions on Computer Systems, vol. 14, No. 3, Aug. 1996, pp. 287-310.

* cited by examiner

ITEM AND METHOD FOR PERFORMING A CLUSTER TOPOLOGY SELF-HEALING PROCESS IN A DISTRIBUTED DATA SYSTEM CLUSTER

BACKGROUND OF THE INVENTION

1. Field of the Invention

The present invention relates to distributed data systems and, in particular, to providing high availability during performance of a cluster topology self-healing process within a distributed data system cluster.

2. Description of Related Art

Cooperating members, or nodes, of a distributed data system may form a cluster to provide transparent data access and data locality for clients, abstracting the possible complexity of the data distribution within the cluster away from the clients. Nodes may be servers, computers, or other computing devices. Nodes may also be computing processes, and thus multiple nodes may exist on the same server, computer, or other computing device.

A cluster may provide high availability by maintaining multiple copies of the same data and distributing these copies among the nodes included in the cluster. Upon failure of a node in the cluster and loss of at least one copy of a portion of the cluster's data, the cluster may repair the failure through a "self-healing" process. The repair typically involves replicating data that was stored on the failed node from a non-failed node, which also stores that data, onto another cluster node. Thus, the cluster topology self-healing process ensures that a desired number of copies of the data remain in the cluster. For example, two cluster nodes may store duplicates of the same data. In response to the failure of one of these two nodes, the non-failed node may duplicate the data onto a third node in order to ensure that multiple copies of data remain in the cluster and/or to maintain high availability.

During self-healing, a cluster may not be able to provide continuous service to clients. The data duplication may consume significant time and bandwidth, as well as other computing resources, which are then unavailable to respond to client requests. Moreover, allowing access to the data being duplicated may result in synchronization problems that affect data accuracy and consistency. One solution to such problems is to not allow client connection to the nodes involved in the cluster topology self-healing process. Alternatively, a cluster may attempt to provide continuous service to clients during self-healing, although performance may be limited. For example, while access to the nodes involved in the cluster topology self-healing process may be permitted, access to the data being replicated may not be permitted. In such a situation, client requests targeting the data that is being replicated may not be serviced or the client requests may be delayed until the cluster topology self-healing process is completed. Thus, all of these solutions negatively impact the quality of service provided to the client. Accordingly, it is desirable to be able to provide higher quality of service to clients during performance of a cluster topology self-healing process.

SUMMARY

A cluster topology self-healing process may be performed in response to a node failure in order to replicate a data set stored on a failed node from a first node storing another copy of the data set to a second non-failed node. Various embodiments of systems and methods for a performing cluster topology self-healing process by subdividing the data set to be replicated into several subsets and individually locking each subset for performance of the self-healing process are disclosed. In these embodiments, a cluster may respond to client access requests targeting the data set being replicated during the cluster topology self-healing process. Since the subsets may be copied more quickly than the entire data set may be copied, each subset may be locked for significantly less time than it takes to copy the entire data set. Accordingly, client access requests targeting a locked subset will be delayed for less time than if the entire data set is locked during the self-healing process.

In one embodiment, a method involves: detecting a failed node within a cluster, where the failed node stores a copy of a particular data set, and performing a cluster topology self-healing process to copy that data set from the first node to the second node in response to detecting the failed node. The cluster topology self-healing process involves: locking one of several domains included in the data set, where locking that domain does not lock any of the other domains in the data set; storing data sent from the first node to the second node in the domain; and releasing the domain. This process of locking, storing, and releasing may then be repeated for each other domain in the data set. While the cluster topology self-healing process is being performed, the second node may receive a client write access request targeting one of the domains. If the targeted domain is not locked for performance of the self-healing process, the second node may modify that domain in response to the client write access request.

In one embodiment, a distributed data system may include a distributed data system cluster that includes several nodes and a client node coupled to the cluster by a network. The distributed data system cluster stores several data sets. Each data set is replicated on at least two of the cluster nodes. In response to detecting the failure of a first node that stores a copy of a first data set, the distributed data system cluster is configured to perform a cluster topology self-healing process to copy the first data set from a second node to a third node. The distributed data system cluster is configured to perform the cluster topology self-healing process by: locking a subset of the first data set without locking any other subset of the first data set; copying data included in the subset from the second node to the third node; releasing the subset; and repeating the process of locking, copying, and releasing for each other subset included in the first data set. If the distributed data system cluster receives a client write access request targeting one of the subsets of the first data set from the client node during performance of the cluster topology self-healing process, the distributed data system cluster is configured to respond to the client write access request by modifying that subset if the first subset of the first data set is not locked for performance of the cluster topology self-healing process.

One embodiment of a device for use in a distributed data system cluster may include a communication interface, a data store, and a replication topology manager. The communication interface may be configured to send and receive communications from one or more other nodes and to detect a failed node within the distributed data system cluster. The replication topology manager may be configured to participate in a copy operation involving a data set with another node in response to the communication interface detecting the failed node. A copy of the data set is stored on the failed node. The replication topology manager is configured to participate in the copy operation by: locking a first subset of the data set in the data store without locking any other subset of the data set; performing a copy operation for the first subset of the data set; releasing the first subset of the data set; and repeating the process of locking, performing, and releasing for each other subset of the data set.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood that the drawings and detailed description are not intended to limit the invention to the particular form disclosed but, on the contrary, the intention is to cover all modifications, equivalents, and alternatives falling within the spirit and scope of the present invention as defined by the appended claims. The headings used are for organizational purposes only and are not meant to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Figure 1A:
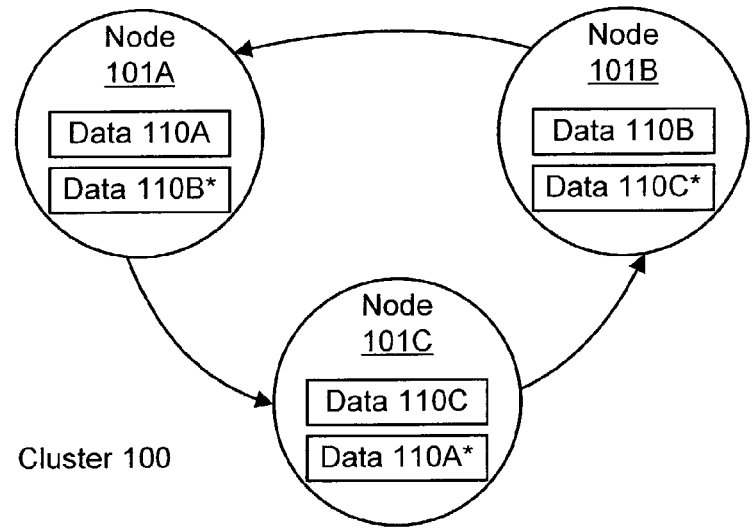
FIG. 1A illustrates a cluster, according to one embodiment.

FIG. 1A illustrates one embodiment of a cluster 100 that includes nodes 101A-101C. Cluster 100 is an example of a distributed data system cluster in which data is replicated on several nodes. As used herein, a "node" may be a stand-alone computer, server, or other computing device, as well as a virtual machine, thread, process, or combination of such elements. A "cluster" is a group of nodes that provide high availability and/or other properties, such as load balancing, failover, and scalability. For example, replicating data within a cluster may lead to increased availability and failover with respect to a single node failure. Similarly, subsets of a cluster's data may be distributed among several nodes based on subset size and/or how often each subset of data is accessed, leading to more balanced load on each node. Furthermore, a cluster may support the dynamic addition and removal of nodes, leading to increased scalability.

Nodes 101A-101C may be interconnected by a network of various communication links (e.g., electrical, fiber optic, and/or wireless links). Cluster 100 may span a large network or combination of networks (e.g., the Internet or a local intranet) and include multiple computing devices in some embodiments. In other embodiments, a cluster 100 may include a computing device on which multiple processes are executing.

Cluster 100 stores data 110. Data 110 is subdivided into several data sets 110A-110C. In one embodiment, data sets 110A-110C may be (roughly) equally sized. For example, if the cluster 100 is storing 9 Mb of data 110 and cluster 100 includes 3 nodes 101, each data set may be approximately 3 Mb in size. As illustrated, data 110 is duplicated within cluster 100. Accordingly, each node 101 stores two different data sets. Note that in some embodiments, data may be subdivided into data sets according to a data file structure such that each data set includes one or more complete data files. Note also that other embodiments may replicate data more than once within a cluster (e.g., a cluster may include one primary copy and more than one backup copy of each replicated data set).

Data 110 may be physically replicated in several different storage locations within cluster 100. Storage locations may be locations within one or more storage devices included in or accessed by one or more servers, computers, or other computing devices. For example, if each node 101 is a separate computing device, each data set may be replicated in different storage locations included in and/or accessible to at least one of the computing devices. In another example, data may be replicated between multiple processes executing on the same server (e.g., each process may store its copy of the data within a different set of storage locations to which that process provides access). Storage devices may include disk drives, tape drives, CD-ROM drives, memory, registers, and other media from which data may be accessed. Note that in many embodiments, data may be replicated on different physical devices (e.g., on different disk drives within a SAN (Storage Area Network)) to provide heightened availability in case of a physical device failure.

The way in which data is replicated throughout cluster 100 may be defined by cluster 100's replication topology. A replication topology is typically a static definition of how data should be replicated within a cluster. The topology may be specified by use of or reference to node identifiers, addresses, or any other suitable information. The replication topology may include address or connection information for some nodes.

In FIG. 1A, nodes 101A-101C implement a ring replication topology in which each node stores a backup copy of a data set stored on a "previous" node. The directional arrows linking nodes 101A-101C indicate the relationship between a "previous" node (the node from which an arrow points) and a "next" node (pointed to by an arrow). The nodes to either side of a given node are that node's neighboring nodes. A node's neighbors may be virtual neighbors instead of physical neighbors. For example, two adjacent nodes in a replication topology may not be physically adjacent to each other. In general, nodes within a cluster may be configured according to various replication topologies, and thus the ring topology illustrated herein is merely exemplary. Note that throughout this disclosure, drawing features identified by the same numeral followed by a letter (e.g., nodes 101A-101C) may be collectively referred to using the numeral alone (e.g., nodes 101). Note also that in other embodiments, clusters may include different numbers of nodes than illustrated in FIG. 1A.

In the embodiment of FIG. 1A, node 101A adheres to the replication topology by storing a primary copy of data set 110A and a backup copy 110B* (the * notation indicates that a node's copy of that particular data set is a backup copy) of data set 110B for which the previous node 101B stores a primary copy. Similarly, node 101B stores a backup copy 110C* of data set 110C for which node 101C stores a primary copy, and node 101C stores a backup copy 110A* of data set 110A. A node storing a backup copy of a data set is referred to herein as a backup node for that data set. For brevity, a backup copy of a data set is sometimes referred to herein as a backup data set, and a primary copy of a data set is referred to as a primary data set.

Figure 1B:
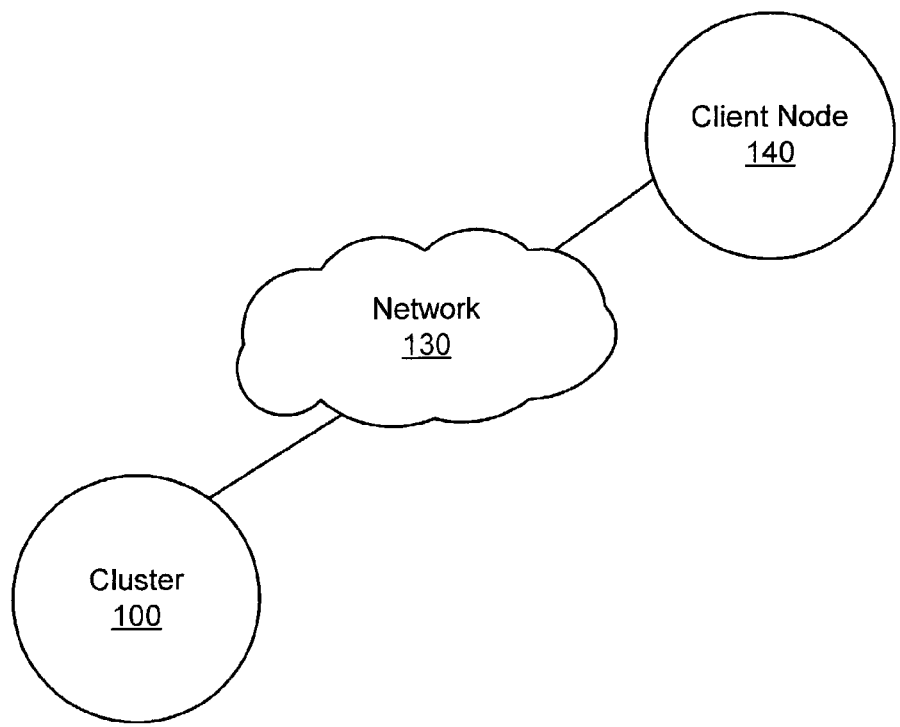
FIG. 1B illustrates a distributed data system, according to one embodiment.

As shown in FIG. 1B, cluster 100 may be configured to interact with one or more external client nodes 140 coupled to the cluster via a network 130. Note that client nodes may also include nodes 101 within cluster 100. During the interaction of the cluster 100 with client nodes, client nodes may send the cluster 100 requests for access to the data 110 stored in the cluster 100. For example, a client node 140 may request read access to data stored in the cluster 100. Similarly, the client node 140 may request write access to update data 110 already stored in the cluster 100 or to create new data within the cluster 100. In the latter situation, the cluster 100 may determine how to assign new load between its nodes 101. For example, new data may be sent to the node currently storing the least amount of data.

In order to handle client access requests for data within cluster 100, each node 101 may have different responsibilities for the various data sets 110A-110D included in data 110. In one embodiment, each node 101's responsibilities for a particular data set may depend on the current distribution of data 110 and the replication topology. For example, each node 101 may be responsible for responding to client access requests targeting data for which that node is the primary node. In some embodiments, a backup node may also be responsible for responding to certain client access requests (e.g., client-initiated read access requests) targeting data for which that node is the backup node. In other embodiments, backup nodes may not be responsible for responding to client access requests targeting data for which those nodes are backup nodes. For example, backup nodes may only be responsible for responding to access requests that are part of a cluster topology self-healing process and to access requests that keep the backup copy up-to-date with respect to the primary copy. Nodes that are neither primary nor backup nodes for a particular data set may have no responsibilities for that data set. Nodes that lack responsibility for a particular data set may not respond to any client requests targeting that data set. If the targeted data set does not currently exist within the cluster (i.e., if a new data set is being written to the cluster 100), a node 101 may be selected to be the primary node for that data set.

Client access requests targeting data 110 may be received by one of the nodes within the cluster 100 and communicated to a node that is responsible for responding to client access requests targeting that data. For example, if the primary node is responsible for responding to client access requests, requests may be forwarded to the primary node (if the receiving node is not the primary node for the targeted data). In response to a client read access request, the primary node may return a copy of the requested data to the client. When handling client write access requests, the primary node may both update its copy of the targeted data and communicate the write access request to the backup node (or nodes, in embodiments with more than one backup node) so that the backup node can update its copy of the targeted data.

Figure 1C:
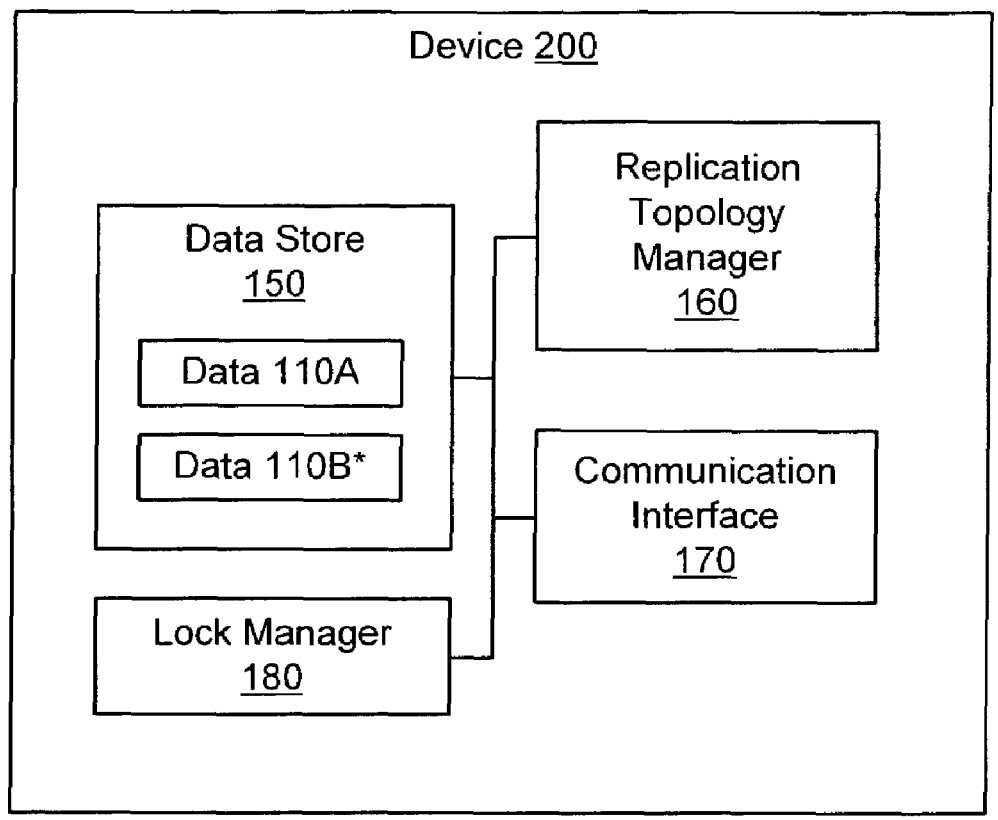
FIG. 1C illustrates a device that may be included in a cluster, according to one embodiment.

FIG. 1C illustrates an exemplary device that may be included in a distributed data system cluster according to one embodiment. Device 200 may be a node (e.g., a processing device such as a server) within a distributed data system cluster in some embodiments. In other embodiments, processes executing on device 200 may be nodes within a distributed data system cluster. In the illustrated example, device 200 includes node 101A (e.g., node 101A may be a process executing on device 200). Device 200 includes a replication topology manager 160, a data store 150, a lock manager 180, and a communication interface 170. In this example, the data store 150 includes the physical memory locations storing data sets 110A and 110B*.

The communication interface 170 may send and receive communications from other nodes. Communication interface 170 may receive client access requests targeting data sets 110A and 110B*. Since the primary data set 110A is stored by device 200, indicating that device 200 either is or includes the primary node for that data set, communication interface 170 may provide client access requests targeting data set 110A to data store 150. In one embodiment, communication interface 170 may forward any client access requests targeting data set 110B* to the primary node (e.g., node 101B) for that data set without providing those access requests to data store 150. If an access request is received from the primary node for data set 110B*, communication interface 170 may provide that access request to data store 150.

The communication interface 170 may also be configured to detect a node failure (e.g., if a node fails to respond to a communication within a predetermined time period or if another node sends a communication identifying a failed node). A node failure may be any event that prevents the failed node from participating in the cluster 100. In one embodiment, a "heartbeat" or ping message may be communicated throughout a cluster to test the status of one or more nodes. Any non-responsive nodes within the cluster may be identified as failed nodes. In one embodiment, a node that neighbors a failed node may further test the status of the failed node (e.g., by sending additional communications to the failed node) to verify that the failed node is not responding. Communication interface 170 may also detect when new nodes (or nodes that previously left the cluster 100 due to failures) enter the cluster 100. Communication interface 170 is one example of a means for detecting a failure of a node included in a distributed data system cluster Communication interface 170 may notify replication topology manager 160 whenever changes in cluster membership (i.e., the addition and/or removal of one or more nodes within cluster 100) are detected. The replication topology manager 160 is configured to maintain the distribution of data 110 defined by the replication topology. A replication topology manager 160 may respond to the dynamic additions and/or departures of nodes 101 in cluster 100 by performing a cluster topology self-healing process involving one or more copy operations for data in data store 150 so that the actual replication of data 110 within cluster 100 closely follows that defined by the replication topology. In one embodiment, the replication topology manager 160 may also update local topology information and/or send information about the status of the cluster to other cluster members as part of performing the self-healing process. Replication topology manager 160 is an example of a means for performing a cluster topology self-healing process.

The replication topology manager 160 may be configured to initiate a copy operation involving a data set for which node 101A is a primary and/or backup node in response to the failure of another node that stores a copy of that data set. For example, node 101A is the primary node for data set 110A. If the backup node 101C for this data set fails, replication topology manager 160 may be configured to identify another node (e.g., node 101B) as a new backup node for data set 110A and to initiate a copy operation to store data set 110A onto that node in order to maintain the ring replication topology illustrated in FIG. 1A. Alternatively, replication topology manager 160 may be configured to identify node 101A as a new backup node for a data set (e.g., data set 110C*) in response to the failure of another node (e.g., node 101B) and to responsively initiate a copy operation to read that data set from its primary node (e.g., node 101C). In general, the replication topology and the non-failed nodes' responsibilities with respect to data stored on a failed node may determine which nodes' replication topology managers initiate a copy operation (e.g., reads from or writes to another node) in response to a node failure. For example, in some embodiments, all copy operations may involve a primary node writing a copy of a data set to a new backup node. Other embodiments may implement copy operations in which a new backup node reads a copy of a data set from the primary node. In yet other embodiments, a new primary node may be selected and that primary node may implement copy operations to read the data from an existing backup node.

Figure 2:
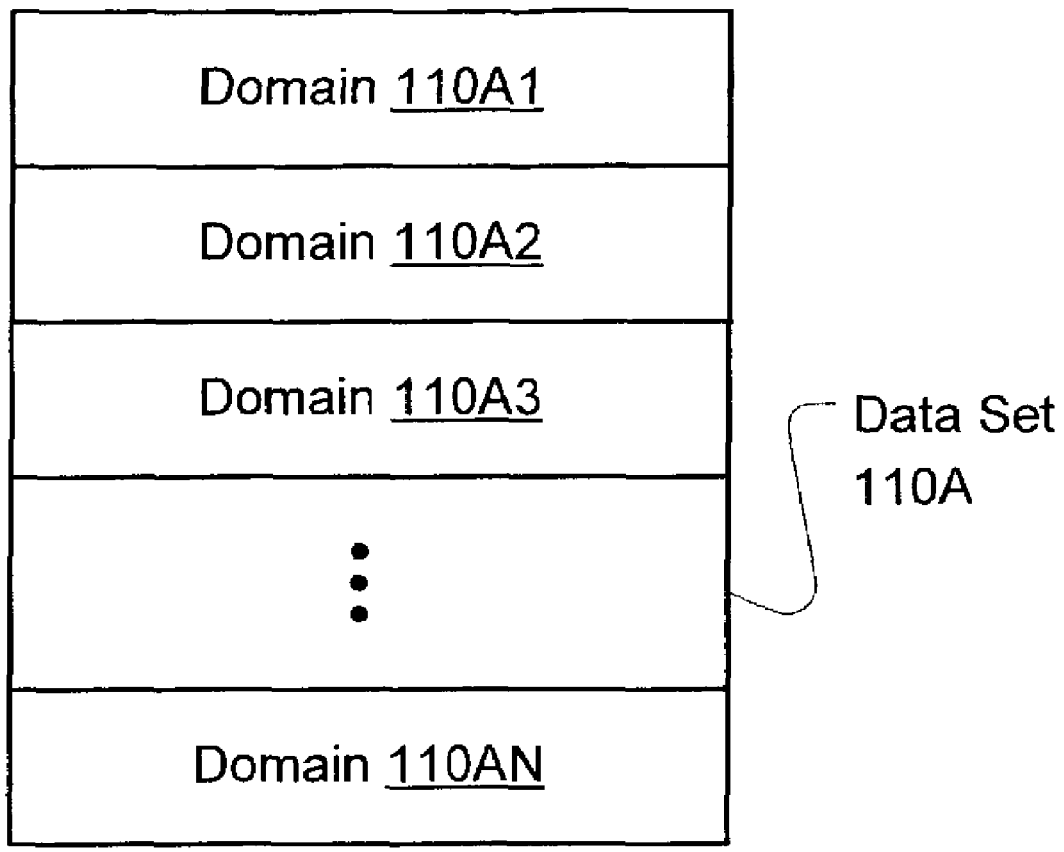
FIG. 2 illustrates how a data set may be subdivided into domains during a cluster topology self-healing process, according to one embodiment.

When initiating a copy operation for a data set 110A, replication topology manager 160 may subdivide the data set 110A to be replicated into several domains 110A1-110AN, as shown in FIG. 2. For example, if replication topology manager 160 is performing a copy operation in response to the failure of node 101C by writing data set 110A to a new backup node 101B, replication topology manager 160 may perform such a copy operation by causing communication interface 170 to send several write access requests to node 101B. Each write access request may include a copy of a domain within data set 110A from data store 150 to be written to a data store on node 101B. Similarly, if replication topology manager 160 is performing a copy operation with node 101C involving data set 110C* in response to the failure of node 101B, replication topology manager 160 may cause communication interface 170 to send several read access requests that each specify a domain within data set 110C to node 101C. Node 101C may return a copy of the requested domain to node 101A in response to each read access request. Node 101A may store each domain within data store 150.

The replication topology manager 160 may subdivide a data set into domains at the volume level (e.g., each domain may include a number of data blocks) or the file system level (e.g., each domain may include one or more files). In some embodiments, the subdivision may be based on both file structure and size (e.g., groups of smaller files may be grouped in one domain while a larger file may be subdivided into several domains). Domain size may be roughly uniform in some embodiments.

The subdivision of a data set into several domains may also depend on the frequency of current accesses to the data set. If a data set is currently experiencing (or has recently experienced) frequent client accesses, it may be desirable to subdivide the data set into more domains that are each smaller in size. This way, less of the data set may be locked at any particular time during the copy operation for the data set. The available bandwidth within the cluster may also affect domain size (e.g., if connections are slow or bandwidth is an expensive resource, the size of the domains may be smaller than if connections were fast or bandwidth inexpensive).

Another factor that may affect domain size relative to data set size is the importance of the data set and the number of times the data set is currently replicated within the cluster. For example, if a data set is relatively important and/or is currently only replicated once within the cluster, it may be desirable to subdivide the data set into a lesser number of larger domains so that the data set can be copied more quickly. On the other hand, if the data set is relatively unimportant and/or is currently already replicated more than one time within the cluster, the data set may be subdivided into a larger number of smaller domains, resulting in less disruption to client accesses targeting the data set during the copy operation while potentially increasing the total time used to copy the data set.

Replication topology manager 160 may perform the cluster topology self-healing process by initiating a copy operation for each of the domains in each data set. Copy operations for each domain may be performed independently of copy operations for each other domain. While performing the copy operation, access to the particular domain being copied may be locked. However, other domains that are not currently being copied within the data set may not be locked, allowing user accesses to those domains to complete normally while the other domain is being copied. This may in turn allow the copy operation to proceed with a less disruptive effect on client accesses than if the entire data set is locked for the duration of the replication process.

Replication topology manager 160 may acquire and release locks by communicating with lock manager 180. Lock manager 180 may provide a locking mechanism for data sets and/or domains within data store 150. Lock manager 180 may also provide locks on smaller subdivisions of data (e.g., each domain may be further subdivided, as described below). Lock manager 180 is configured to lock each domain independently of each other domain within the data set. A lock on a data set locks all domains included in that data set, whereas a lock on a domain does not lock other domains within the same data set. Lock manager 180 may be configured to inhibit certain accesses (e.g., read and/or write) to a particular data set or domain within data store 150 unless the requesting component has acquired a lock on the data set or domain to be accessed. In some embodiments, lock manager 180 may be included in a cluster file system or cluster volume manager that manages access to the data 110 stored by cluster 100.

Lock manager 180 may provide locks in a variety of different ways. For example, a lock may be acquired by sending the requesting component a token associated with the data to be locked, by allowing the requesting component to set a flag associated with the data to a certain value, or by strictly enforcing atomicity constraints such that accesses are ordered relative to each other and that no other component can initiate a subsequent access involving the data until a current access completes.

Lock manager 180 may allow nodes (e.g., the primary and backup nodes for a data set) that store copies of the same data set to lock a local copy independently of other nodes storing a copy of the data set. For example, during the cluster topology self-healing process, the node onto which data is being replicated may lock each domain independently of times at which the node supplying the data locks its copy of each domain. Note that in some embodiments, the node supplying the data may not lock its copy of each domain during performance of the cluster topology self-healing process for the data set.

In order to initiate a copy operation for each domain, replication topology manager 160 may communicate the appropriate copy command (e.g., a read or write access request) to communication interface 170 for communication to another node involved in the copy operation, acquire a lock on the domain to be copied from lock manager 180, and copy the data in that domain (e.g., by either writing data received via communication interface 170 to data store 150 or sending data to another node from data store 150 via communication interface 170). The data in that domain may be sent or received via communication interface 170. After the data is copied (e.g., either written to data store 150 or sent to another node from data store 150 via communication interface 170), the replication topology manager may release the lock on that domain. The replication topology manager 160 may then proceed to initiate a copy operation for other domains within the data set, continuing until all domains have been copied.

If the data set being copied initially does not exist in data store 150, replication topology manager 160 may create each domain within data store 150 before performing the copy operations for the individual domains. For example, replication topology manager 160 may create individual domains in data store 150 for each domain within the data set to be copied. In order to create the domains, replication topology manager 160 may acquire a lock on the data set from lock manager 180, create an entry for each individual domain, and release the lock on the data set. Once created, each individual domain may be locked independently of each other domain, allowing the data within that domain to be replicated without locking any other domains.

While copy operations are being performed for domains in a particular data set, communication interface 170 may receive client access requests targeting that data set. Communication interface 170 may forward requests to the replication topology manage 160r, which may in turn respond to the various requests in different ways depending on the current stage of the replication process. In some embodiments, replication topology manager 160 may be configured to delay or otherwise inhibit performance of requests targeting a domain that is currently locked for the copy operation. However, requests targeting domains that are not locked, either because those domains have not yet been copied or have already been copied, may be allowed to complete. Replication topology manager 160 may track whether each domain has been copied and whether each domain has been updated in response to a client access request during the copy operation. The replication topology manager 160 may be configured to adjust the performance of subsequent copy operations and/or performance of the client access request in response to this information. For example, if a client write access request modifies a domain prior to replication of that domain, the replication topology manager may be configured to not overwrite the domain during the copy operations involved in the self-healing process if the modified domain is already more current than the copy of the domain being used to perform the copy operation.

Figure 3:
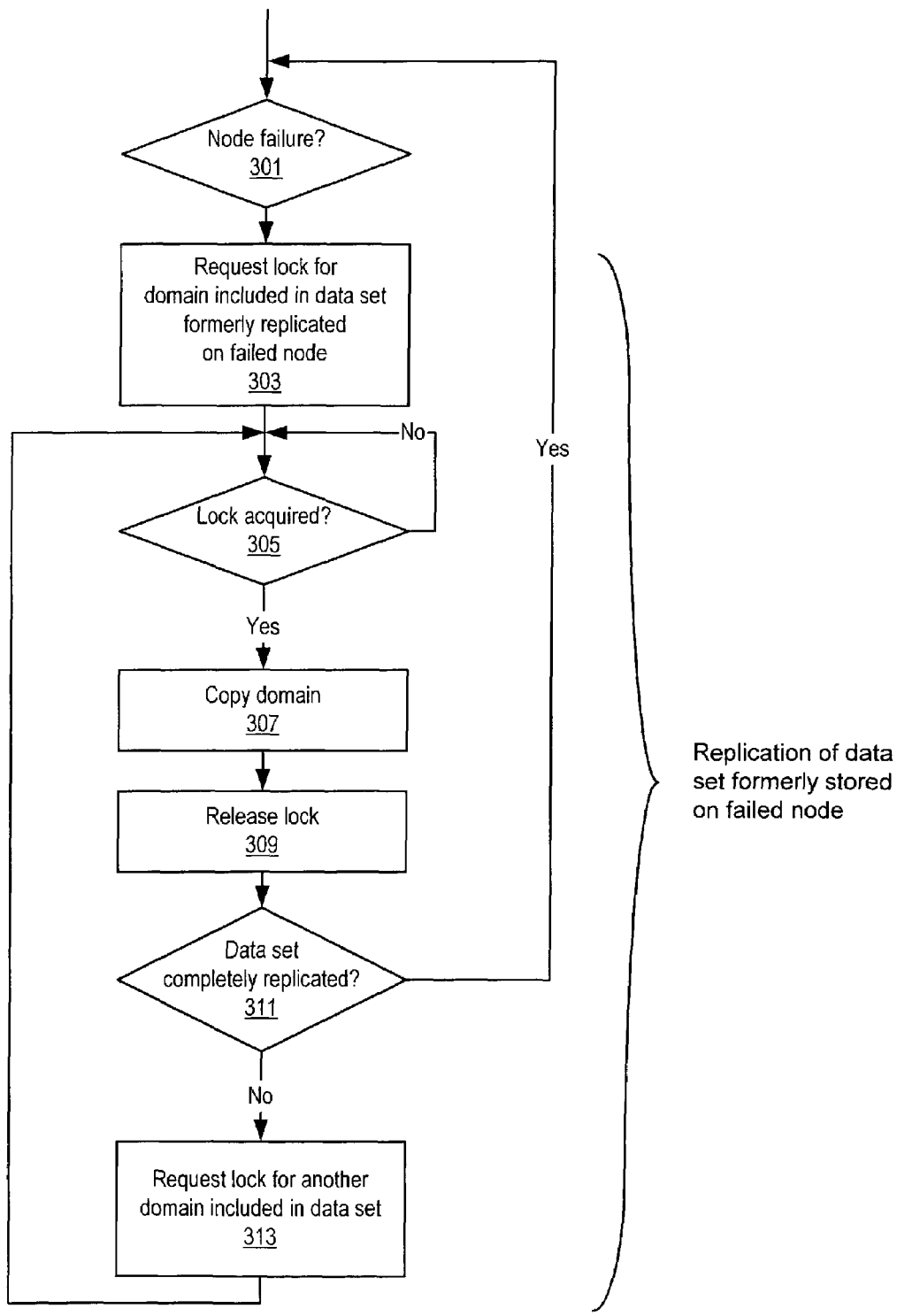
FIG. 3 illustrates one embodiment of a method of performing a cluster topology self-healing process.

FIG. 3 illustrates one embodiment of a method of performing a cluster topology self-healing process. A node storing a copy of a data set stored by the failed node participates in the cluster topology self-healing process in response to detection of the node failure at 301. The data set to be replicated is subdivided into several domains. At 303, a lock for a domain included in the data set formerly replicated on the failed node is requested. Once the lock is acquired at 305, the domain is copied between the two nodes participating in the cluster topology self-healing process, at 307. The lock on the domain is released at 309 after the domain is copied. While the domain is locked, all of the other domains within the data set may not be locked. Accordingly, a client accessing any domain other than the one locked at 305 may experience high quality of service. Furthermore, if the copy operation to copy the locked domain takes less time to complete than a copy operation to copy the entire data set, the domain may remain locked for less time than it would if the entire data set were locked for the duration of the replication process. This may increase the quality of service provided to clients accessing the cluster during the cluster topology self-healing process because client access requests may be less likely to conflict with any particular domain copy operation than if the entire data set were locked.

If additional domains remain to be replicated in the data set, a lock may be requested for another domain in that data set, as shown at 311-313, and the additional domain may be copied. This process may repeat until all of the domains within the data set have been copied, at which point the replication process may complete. The cluster topology self-healing process may restart in response to detection of another node failure at 301. Note that performance of a cluster topology self-healing process may include reassigning various responsibilities for the data set being replicated. These responsibility assignments may be performed before or after replication of the data set.

Note that the order in which domains are copied may vary. For example, in one embodiment, replication may be performed by sequentially copying domains within the data set from one node to another. In other embodiments, domains may be randomly selected for copying. The replication topology manager 160 in one or both of the participating nodes may track which domains have been copied so that no domains are copied more than once. Replication may also involve a replication topology manager 160 selecting the order in which to replicate domains based on current client access patterns. For example, if one domain is being accessed by a client, the replication topology manager 160 may select another domain (if any other domains have not yet been copied) for replacement so as not to decrease the quality of service provided to the client.

If one of the nodes involved in the cluster topology self-healing process fails during performance of any part of the cluster topology self-healing process, the process may be restarted for another pair of nodes.

Figure 4A:
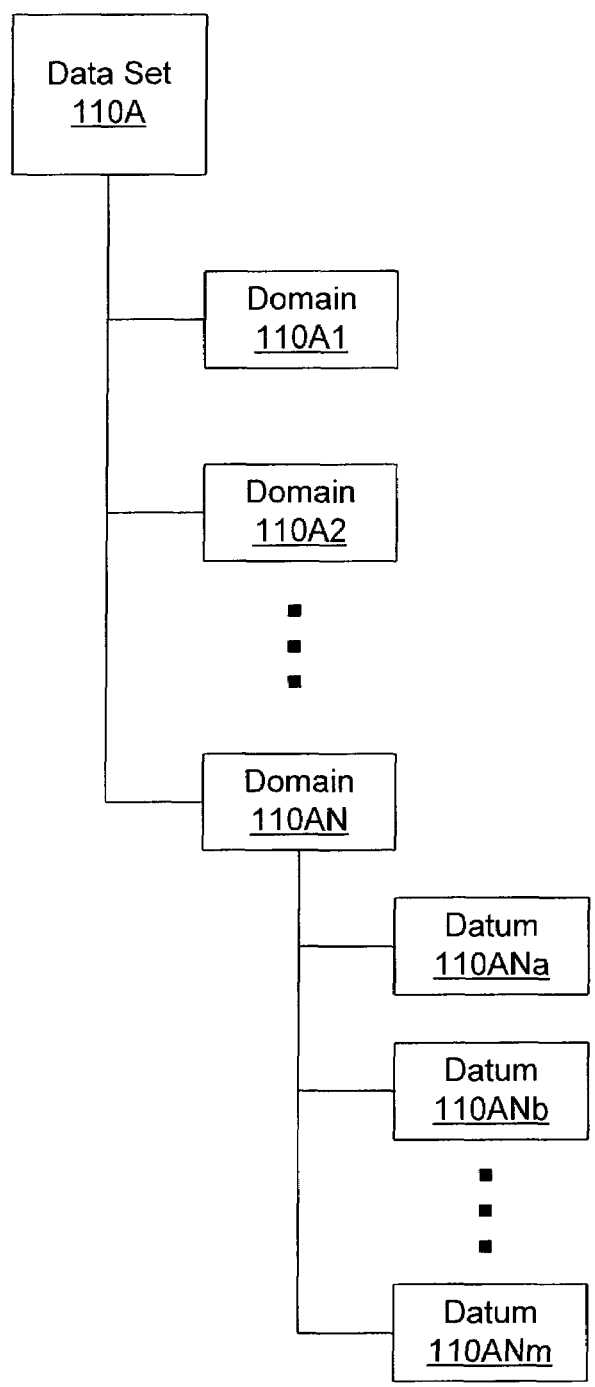
FIG. 4A illustrates an exemplary hierarchy of data that may be used when performing a cluster topology self-healing process, according to one embodiment.

In some embodiments, replication may be performed for hierarchical subdivisions within a data set. For example, FIG. 4A illustrates how a data set 110A may be subdivided into domains 110A1-110AN. Each domain (e.g., 110AN) may be further subdivided to include several individual datum entries (e.g., 110ANa-110ANm).

Figure 4B:
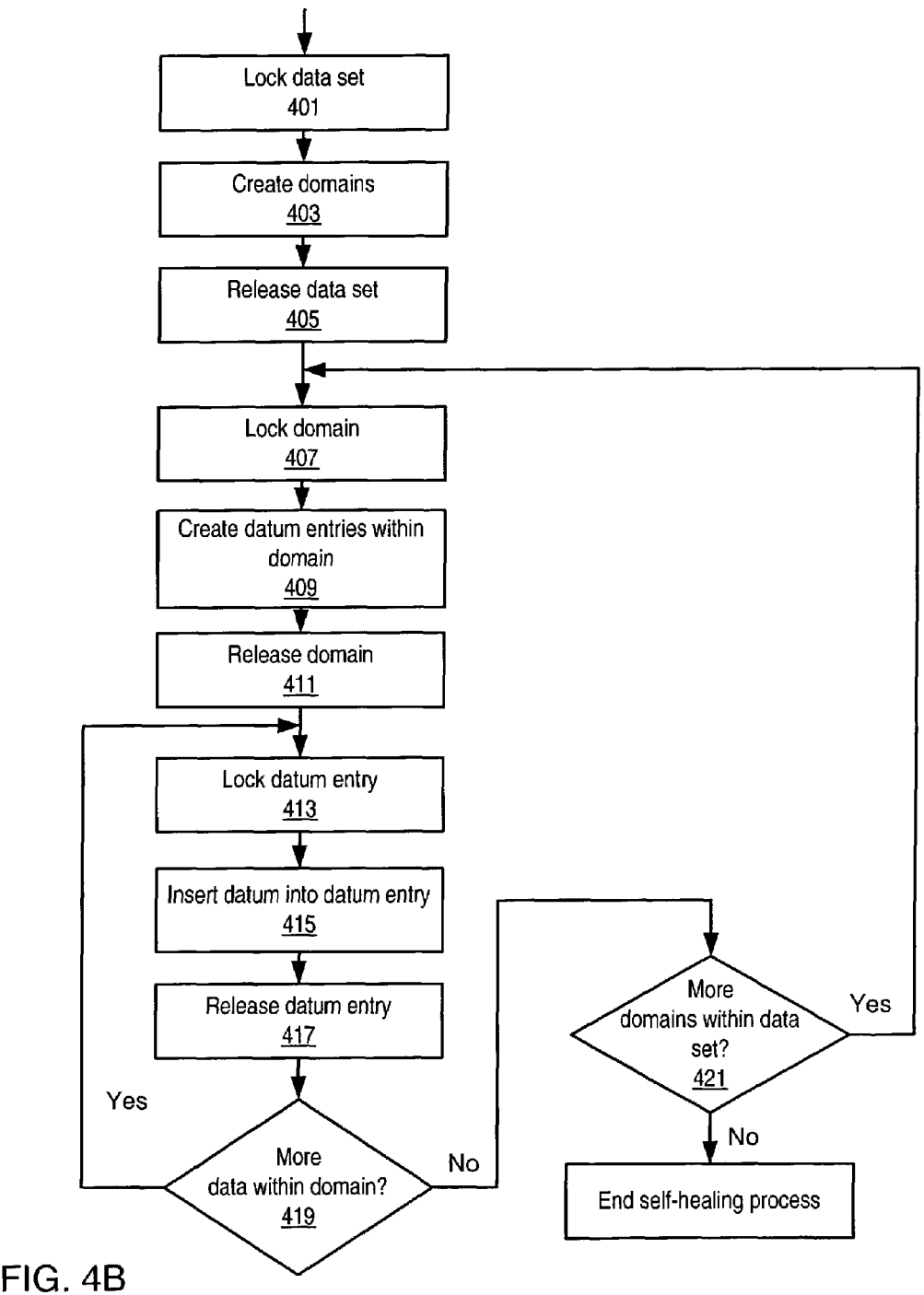
FIG. 4B illustrates another embodiment of a method of performing a cluster topology self-healing process.

FIG. 4B illustrates how a replication topology manager in a node involved in the cluster topology self-healing process may perform a cluster topology self-healing process to replicate the data set divided into a hierarchy of subsets. During the cluster topology self-healing process initiated at 400, the hierarchy may first be established (e.g., in the data store 150 of the node onto which the data set is being replicated) by locking the data set (401), creating an entry for each domain within the data set (403), and releasing the data set (405). One of the domains may then be locked (407), the individual datum entries within that domain may be created (409), and the domain may be released (411). An individual datum entry within the domain may be locked (413), the appropriate datum provided via the copy operation may be inserted into the locked datum entry (415), and the datum entry may be released (417). This process may repeat until all of the data within the domain has been replicated, as indicated at 419. The functions 407-419 may then be repeated for additional domains within the data set until the entire data set has been replicated, as indicated at 421. The smaller datum units may each be locked for a relatively brief time (compared to situations in which an entire domain or data set is locked while all data in that domain or data set is copied) during the cluster topology self-healing process. Thus, dividing the data set into smaller groups of data in such a hierarchical fashion may further reduce the likelihood of a decrease in quality of service due to a client access request targeting a locked datum.

During the cluster topology self-healing process illustrated in FIG. 4B, the nodes involved in the cluster topology self-healing process may receive client write access requests targeting a datum within the data set being replicated. In order to maintain synchronization of each node's copy of the data set, the nodes may be configured to respond to access requests received during performance of a cluster topology self-healing process differently than the nodes would otherwise respond. For example, in one embodiment, the backup node for the data set may not perform any updates to the data set being replicated in response to client write access requests received during the cluster topology self-healing process. The primary node for the data set may perform the client write access requests and track which modifications should be forwarded to the backup node upon completion of the cluster topology self-healing process. For example, if the primary node updates a datum before sending that datum to the backup node, the modification may not be forwarded to the backup node when the cluster topology self-healing process completes since the modification is already reflected in the copy provided to the backup node.

Note that in an alternative to the embodiment of FIG. 4B, each domain may be created individually, that domain's datum may be copied, and that domain may be released before another domain is created. In other words, the data set may be locked (401) and released (405) one time for each domain instead of being locked a single time for all domains as shown in FIG. 3.

Figure 4C:
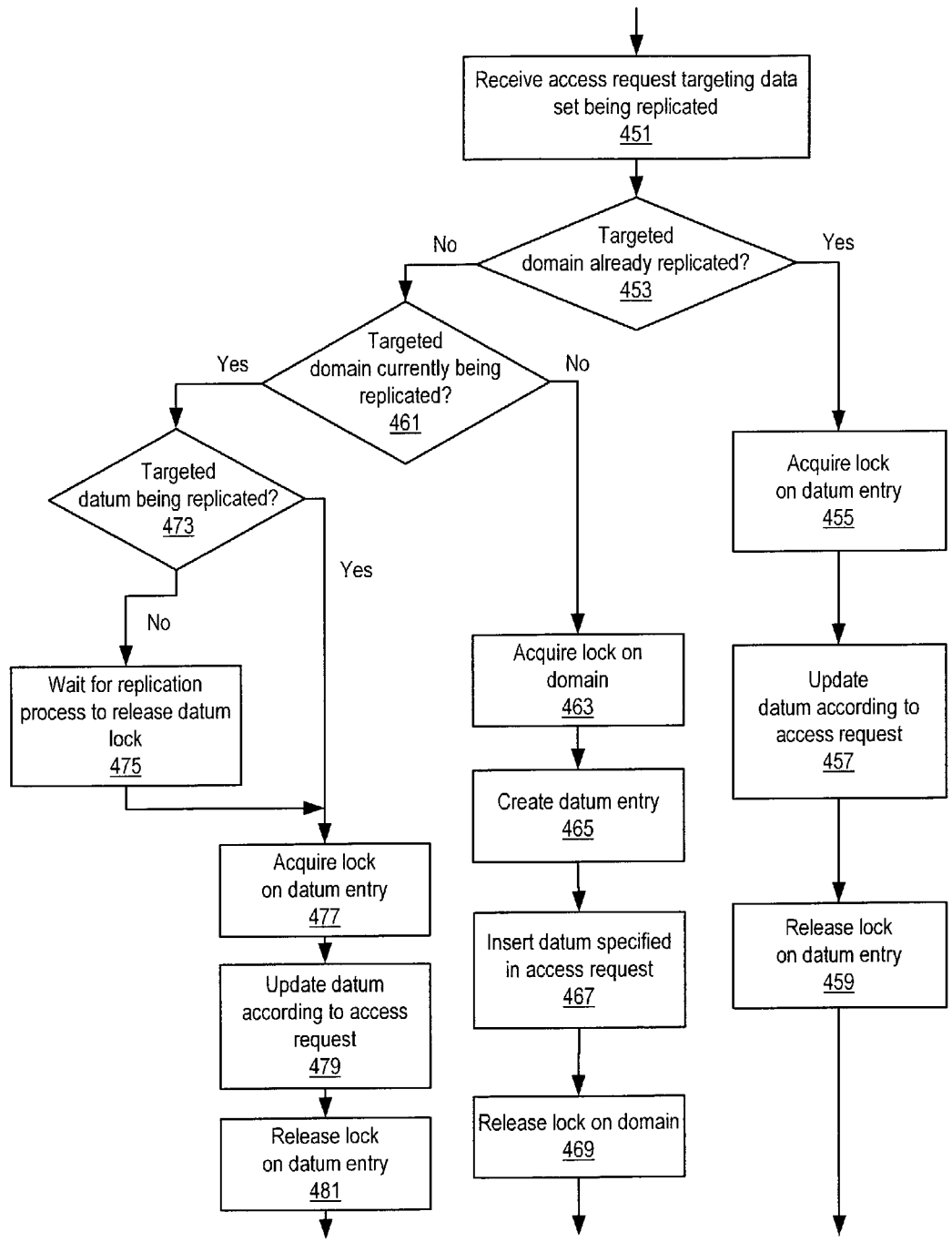
FIG. 4C illustrates a method of handling client access requests targeting a data set being replicated during a cluster topology self-healing process, according to one embodiment.

In other embodiments, the backup node may be configured to respond to client write access requests received during the cluster topology self-healing process, as shown in FIG. 4C. In the embodiment illustrated in FIG. 4C, a node receives a write access request targeting a data set being replicated on that node as part of a cluster topology self-healing process, as indicated at 451. If the targeted domain has already been replicated (i.e., the domain has been copied to or from another node), the node may respond to the client write access request by acquiring a lock on the targeted datum entry (455), modifying the datum included in that entry according to the client access request (457), and releasing the lock on the datum entry (459). This may be the same response the backup node provides to client write access requests when a cluster topology self-healing process is not being performed.

If the targeted domain has not already been replicated and is not currently being replicated, the node may acquire a lock on the targeted domain, as indicated at 463. Note that if the targeted domain has not already been created, the data set may be locked, the domain may be created, and the data set may be released prior to performance of function 463. Once the targeted domain is locked, a datum entry may be created (465) and the datum included in the client write access request may be inserted into the datum entry (467). The domain lock may then be released (469). When the domain is subsequently replicated, the node may determine whether to overwrite the datum inserted at 467 with the copy of the datum provided as part of the replication process based on one or more indications (e.g., timestamps associated with each access request, ordering properties implemented by the cluster interconnect, etc.) as to which copy is more up-to-date.

If the targeted domain is currently being replicated, the node may determine whether the targeted datum is currently being replicated, at 473. If so, the replication process may have a lock on the targeted datum entry and thus the node may wait for the replication process to release the datum entry lock, as indicated at 475. Once the targeted datum is not currently locked by the replication process, a lock may be acquired for the datum entry (477), the datum may be updated according to the client write access request (479), and the data entry may be released (481). If the datum has not yet been replicated, the node may determine whether to overwrite the datum with the copy of the datum provided as part of the replication process by determining which copy is more up-to-date. For example, timestamps associated with each of the client write access request and the copy of the datum provided as part of the cluster topology self-healing process may be compared to determine which copy of the datum is more current.

In embodiments where a backup node may respond to client access requests during the cluster topology self-healing process, the interconnect coupling the nodes in the cluster may be configured to implement a communication ordering property. For example, an ordering property may specify that if multiple nodes receive the same communications, each of the nodes will receive the communications in the same order. An ordering property may also order communications such that if one node sends a communication B to another node after receiving a communication A and the other node also receives communication B, the other node will receive communication B after receiving communication A. Alternatively, all access requests, whether part of the replication process or client requests, may be time stamped to reflect their relative order (e.g., an address switch in the cluster interconnect may timestamp each communication). By implementing an ordering property or using timestamps, the backup node may determine whether to perform a client write access request to its copy of the datum based on whether its copy is already more up-to-date than the copy supplied with the client write access request.

Various embodiments may further include receiving, sending or storing instructions and/or data implemented in accordance with the foregoing description upon a computer accessible medium. Generally speaking, a computer accessible medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

It will be appreciated by those of ordinary skill having the benefit of this disclosure that the illustrative embodiments described above are capable of numerous variations without departing from the scope and spirit of the invention. Various modifications and changes may be made as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method, comprising:
   detecting a failed node within a cluster comprising a first node, the failed node, and a second node, wherein the failed node stores a data set;
   in response to said detecting, performing a cluster topology self-healing process to copy the data set from the first node to the second node, wherein the data set is dividable into a plurality of domains, and wherein the cluster topology self-healing process includes:
   locking one of the plurality of domains on the second node, wherein said locking does not lock any other one of the plurality of domains on the second node;
   subsequent to said locking, storing data included in the one of the plurality of domains sent from the first node to the second node;
   subsequent to said storing, releasing the one of the plurality of domains; and
   repeating said locking, said copying, and said releasing for each other one of the plurality of domains.

2. The method of claim 1, further comprising:
   the second node receiving a client write access request targeting a first one of the plurality of domains during said performing the cluster topology self-healing process; and
   if the first one of the plurality of domains is not locked, the second node responsively locking the one of the plurality of domains and modifying the first one of the plurality of domains.

3. The method of claim 1, further comprising:
   creating a plurality of datum entries in the one of the plurality of domains subsequent to said locking and prior to said releasing; and
   performing said storing subsequent to said releasing, wherein said storing comprises:
   locking one of the plurality of datum entries;
   subsequent to said locking of one of the plurality of datum entries, storing a portion of the data in the one of the plurality of datum entries;
   subsequent to said storing a portion of the data in the one of the plurality of datum entries, releasing the one of the plurality of datum entries; and
   repeating said locking one of the plurality of datum entries, said storing a portion of the data in the one of the plurality of datum entries, and said releasing the one of the plurality of datum entries for each other one of the plurality of datum entries.

4. The method of claim 3, further comprising:
   the second node receiving a client write access request targeting the one of the plurality of domains during said performing the cluster topology self-healing process, wherein the client write access request targets data included in a first one of the plurality of datum entries; and
   if the first one of the plurality of datum entries is not locked, the second node responsively locking the one of the plurality of datum entries and modifying the data included in the first one of the plurality of datum entries.

5. The method of claim 4, further comprising the second node performing said modifying in response to determining that a copy of the data included with the client write access request is more current than a copy of the data stored as part of performance of the cluster topology self-healing process.

6. The method of claim 4, further comprising the second node not storing a copy of the data included in the first one of the plurality of datum entries received as part of performance of the cluster topology self-healing process subsequent to said modifying if a copy of the data included with the client write access request is more current than a copy of the data received as part of performance of the cluster topology self-healing process.

7. The method of claim 6, further comprising the second node determining that the copy of the data included with the client write access request is more current than the copy of the data received as part of performance of the cluster topology self-healing process by comparing timestamps included with each copy of the data.

8. The method of claim 4, further comprising the second node creating the first one of the plurality of datum entries in response to receiving the client write access request if the first one of the plurality of datum entries has not yet been created as part of the cluster-topology self-healing process.

9. The method of claim 1, wherein said locking further comprises locking the domain on the first node.

10. A distributed data cluster comprising:
    a plurality of nodes;
    an interconnect coupling the plurality of nodes;
    wherein a first node included in the plurality of nodes is configured to detect a failure of a second node included in the plurality of nodes, wherein the first node stores a copy of a data set stored by the second node;
    wherein in response to detecting the failure of the second node, the first node is configured to perform a copy operation for the data set with a third node included in the plurality of nodes over the interconnect;
    wherein the third node is configured to perform the copy operation by repeatedly: locking a subset of the data set on the third node, storing a copy of the locked subset received from the first node, and releasing the locked subset for each subset of a plurality of subsets included in the data set;
    wherein the third node is configured to lock the subset of the data without locking any other one of the plurality of subsets.

11. The distributed data system cluster of claim 10, wherein the plurality of subsets are organized according to a hierarchy.

12. The distributed data system cluster of claim 10, wherein each of the plurality of subsets includes a constant number of data blocks.

13. The distributed data system cluster of claim 10, wherein the third node is configured to respond to a client write access request targeting a first subset of the data set if the first subset is not locked by: locking on the first subset, modifying the first subset responsive to the client write access request, and releasing the first subset;
    wherein the client write access request is received during performance of the copy operation.

14. The distributed data system cluster of claim 13, wherein the third node is configured to respond to the client write access request in response to determining that a copy of the first subset of the data set included with the client write access request is more current than a copy of the first subset of the data set stored as part of performance of the copy operation.

15. The distributed data system cluster of claim 13, wherein the third node is configured to not store a copy of the first subset of the data set received as part of performance of the copy operation subsequent to receiving the client write access request if the copy of the first subset of the data set included with the client write access request is more current than the copy of the first subset of the data set received as part of performance of the copy operation.

16. The distributed data system cluster of claim 15, wherein the third node is configured to determine that the copy of the first subset of the data set included with the client write access request is more current than the copy of the first subset of the data set received as part of performance of copy operation by comparing timestamps included with each copy of the first subset of the data set.

17. A distributed data system, comprising:
a distributed data system cluster comprising a plurality of nodes, wherein the distributed data system cluster stores a plurality of data sets, and wherein each data set is replicated on at least two of the plurality of nodes; and
a client node coupled to the plurality of nodes by a network, wherein the client node is configured to send a write access request targeting a first data set of the plurality of data sets to the cluster via the network;
wherein in response to detecting a failure of a first node of the plurality of nodes storing the first data set of the plurality of data sets, the distributed data system cluster is configured to perform a cluster topology self-healing process to copy the first data set from a second node to a third node;
wherein the distributed data system cluster is configured to perform the cluster topology self-healing process by:
locking a subset of a plurality of subsets included in the first data set on the third node, wherein the distributed data system cluster is configured to perform said locking without locking any other subset of the plurality of subsets;
subsequent to said locking, copying data included in the subset of the first one of the data sets from the second node to the third node;
subsequent to said copying, releasing the subset of the first one of the data sets; and
repeating said locking, said copying, and said releasing for each other subset included in the first data set;
wherein if the distributed data system cluster receives the client write access request during performance of the cluster topology self-healing process, the distributed data system cluster is configured to respond to the client write access request by modifying a first subset of the first data set targeted by the client write access request if the first subset of the first data set is not locked for performance of the cluster topology self-healing process.

18. The distributed data system of claim 17, wherein the plurality of subsets are organized according to a hierarchy.

19. The distributed data system of claim 17, wherein each of the plurality of subsets includes a constant number of data blocks.

20. The distributed data system of claim 17, wherein if the first subset is not locked for performance of the cluster topology self-healing process, the third node is configured to respond to the client write access request targeting the first subset of the first data set by: locking on the first subset, modifying the first subset responsive to the client write access request, and releasing the first subset.

21. The distributed data system of claim 20, wherein the third node is configured to respond to the client write access request in response to determining that a copy of the first subset included with the client write access request is more current than a copy of the first subset stored as part of performance of the copy operation.

22. The distributed data system of claim 20, wherein the third node is configured to not store a copy of the first subset received as part of performance of the copy operation subsequent to receiving the client write access request if the copy of the first subset included with the client write access request is more current than the copy of the first subset received as part of performance of the copy operation.

23. The distributed data system of claim 22, wherein the third node is configured to determine that the copy of the first subset included with the client write access request is more current than the copy of the first subset received as part of performance of copy operation by comparing timestamps included with each copy of the first subset.

24. A device for use in a distributed data system cluster, the device comprising:
a communication interface configured to send and receive communications from one or more other nodes, wherein the communication interface is configured to detect a failed node within the distributed data system cluster;
a data store coupled to the communication interface and configured to store data; and
a replication topology manager coupled to the communication interface and configured to participate in a copy operation involving a data set with another node in response to the communication interface detecting the failed node, wherein a copy of the data set is stored on the failed node;
wherein the replication topology manager is configured to participate in the copy operation by:
locking a first subset of the data set in the data store, wherein the replication topology manager is configured to acquire a lock on the first subset of the data set without acquiring a lock on any other subset of the data set;
subsequent to said locking, performing a copy operation for the first subset of the data set;
subsequent to said performing a copy operation, releasing the first subset of the data set; and
repeating said locking, said performing, and said releasing for each other subset of the data set.

25. A system, comprising:
means for detecting a failed node within a cluster comprising a first node, the failed node, and a second node, wherein the failed node stores a data set;
means for performing a cluster topology self-healing process to copy the data set from the first node to the second node in response to detecting the failed node, wherein the data set is dividable into a plurality of domains, and wherein the cluster topology self-healing process includes:
locking one of the plurality of domains, wherein said locking does not lock any other one of the plurality of domains; and
subsequent to said locking, storing data included in the one of the plurality of domains sent from the first node to the second node; and
subsequent to said storing, releasing the one of the plurality of domains; and
repeating said locking, said copying, and said releasing for each other one of the plurality of domains.

* * * * *